(12) United States Patent
Files

(10) Patent No.: US 10,173,250 B2
(45) Date of Patent: Jan. 8, 2019

(54) REMOVING MATERIAL BUILDUP FROM AN INTERNAL SURFACE WITHIN A GAS TURBINE ENGINE SYSTEM

(71) Applicant: United Technologies Corporation, Farmington, CT (US)

(72) Inventor: Jay C. Files, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 167 days.

(21) Appl. No.: 15/227,575

(22) Filed: Aug. 3, 2016

(65) Prior Publication Data
US 2018/0036776 A1 Feb. 8, 2018

(51) Int. Cl.
| B08B 9/032 | (2006.01) |
| B08B 9/04 | (2006.01) |
| F02B 77/04 | (2006.01) |
| B08B 9/049 | (2006.01) |
| F01D 25/00 | (2006.01) |

(52) U.S. Cl.
CPC .............. *B08B 9/0322* (2013.01); *B08B 9/04* (2013.01); *B08B 9/0495* (2013.01); *F01D 25/002* (2013.01); *F02B 77/04* (2013.01); *F02B 2077/045* (2013.01); *F05D 2230/72* (2013.01); *F05D 2260/607* (2013.01); *F05D 2260/98* (2013.01)

(58) Field of Classification Search
CPC ......... B08B 9/0322; B08B 9/04; F02B 77/04; F02B 2077/045; F05D 2260/98
See application file for complete search history.

(56) References Cited

U.S. PATENT DOCUMENTS

| 3,321,184 | A | * | 5/1967 | Goss | .......................... E03F 9/00 |
| | | | | | 134/167 C |
| 4,995,761 | A | | 2/1991 | Barton | |
| 5,018,355 | A | | 5/1991 | Foster | |
| 5,049,003 | A | | 9/1991 | Barton | |
| 5,617,604 | A | * | 4/1997 | Erich | ....................... B08B 9/055 |
| | | | | | 15/104.061 |
| 5,797,993 | A | * | 8/1998 | Woehleke | ............. B08B 9/0557 |
| | | | | | 134/22.12 |
| 5,857,476 | A | * | 1/1999 | Bee | .......................... B08B 9/021 |
| | | | | | 134/167 C |
| 6,224,378 | B1 | | 5/2001 | Valdes et al. | |
| 6,363,566 | B1 | | 4/2002 | Collins | |

(Continued)

FOREIGN PATENT DOCUMENTS

JP 02000325904 A * 11/2000 ............... B08B 9/04

OTHER PUBLICATIONS

Partial EP Search Report for EP17183460.9 dated Dec. 13, 2017.

*Primary Examiner* — Sharidan Carrillo
(74) *Attorney, Agent, or Firm* — O'Shea Getz P.C.

(57) ABSTRACT

A method is provided involving a gas turbine engine system. The method includes configuring a plug within a fluid passage in the gas turbine engine system, where the plug is between first and second portions of the fluid passage. Material is removed from an interior surface of the fluid passage in the first portion of the fluid passage to provide removed material, where the plug substantially prevents the removed material from entering the second portion of the fluid passage. The removed material is directed out of the fluid passage. The plug is removed from the fluid passage.

15 Claims, 7 Drawing Sheets

(56) References Cited

U.S. PATENT DOCUMENTS

| | | | |
|---|---|---|---|
| 6,374,838 B1* | 4/2002 | Baugh | B08B 9/053 134/167 C |
| 6,491,048 B1 | 12/2002 | Foster | |
| 6,527,869 B1* | 3/2003 | Bourg | B08B 9/0551 134/1 |
| 6,712,080 B1* | 3/2004 | Handschuh | B08B 9/0321 134/103.1 |
| 7,497,220 B2* | 3/2009 | Asplund | B08B 3/02 134/167 R |
| 7,628,909 B2 | 12/2009 | Cobb | |
| 2005/0115588 A1* | 6/2005 | Farris | B08B 9/053 134/22.11 |
| 2005/0283927 A1* | 12/2005 | Kinnari | F16L 55/38 15/3.5 |
| 2010/0162503 A1* | 7/2010 | Rosen | B08B 9/035 15/104.061 |
| 2011/0008151 A1* | 1/2011 | Heyes | F01D 25/002 415/121.3 |
| 2011/0303245 A1 | 12/2011 | Schmitz-Goeb et al. | |
| 2013/0259672 A1* | 10/2013 | Suciu | F01D 1/04 415/208.1 |
| 2014/0251376 A1* | 9/2014 | Baker | F16L 55/46 134/8 |
| 2014/0283876 A1* | 9/2014 | Fjerdingstad | B08B 9/0535 134/8 |
| 2016/0067750 A1 | 3/2016 | Griffiths et al. | |

* cited by examiner

REMOVING MATERIAL BUILDUP FROM AN INTERNAL SURFACE WITHIN A GAS TURBINE ENGINE SYSTEM

BACKGROUND OF THE INVENTION

1. Technical Field

This disclosure relates generally to a gas turbine engine and, more particularly, to removing material buildup from an internal surface within a system of a gas turbine engine.

2. Background Information

A gas turbine engine may include a mid-turbine frame with an array of turbine stator vanes. Each of these turbine stator vanes extends radially across a core gas path at a location axially between a high pressure turbine rotor and a low pressure turbine rotor. A conduit of a lubrication system for the gas turbine engine may be routed through at least one of the turbine stator vanes. While this conduit may be insulated from the core gas path, the conduit and the lubricant flowing therethrough may still be subject to relatively high temperatures during turbine engine operation. This subjects the conduit and the lubricant flowing therethrough to at least one heat cycle each time the engine is turned on and then off. Such heat cycles may cause lubricant within the conduit to coke onto an interior surface of the conduit. To prevent this lubricant coke from effecting turbine engine operation, the gas turbine engine is disassembled in order to replace the conduit. However, disassembling a gas turbine engine is time consuming and expensive.

SUMMARY OF THE DISCLOSURE

According to an aspect of the present disclosure, a method is provided involving a gas turbine engine system. This method includes: configuring a plug within a fluid passage in the gas turbine engine system, the plug being between first and second portions of the fluid passage; removing material from an interior surface of the fluid passage in the first portion of the fluid passage to provide removed material, wherein the plug substantially prevents the removed material from entering the second portion of the fluid passage; directing the removed material out of the fluid passage; and removing the plug from the fluid passage.

According to another aspect of the present disclosure, another method is provided involving a gas turbine engine system. This method includes: inserting a nozzle into a fluid passage in the gas turbine engine system; directing a stream of pressurized fluid out of the nozzle towards an interior surface of the fluid passage to remove material from the interior surface of the fluid passage; and directing the removed material out of the fluid passage along a path in which the nozzle was inserted into the fluid passage.

According to still another aspect of the present disclosure, a method is provided involving a gas turbine engine. This method includes: removing coked lubricant material from an interior surface of a fluid passage in the gas turbine engine to provide removed coked lubricant material, the gas turbine engine being substantially assembled and the fluid passage being within the substantially assembled gas turbine engine during the removal of the coked lubricant material, the fluid passage including a first portion and a second portion downstream of the first portion, wherein the coked lubricant material is removed from the interior surface within the first portion; and directing the removed coked lubricant material out from the fluid passage without going through the second portion of the fluid passage.

The method may also include: configuring a plug within the fluid passage before inserting the nozzle into the fluid passage, the plug being between first and second portions of the fluid passage. The interior surface may be in the first portion of the fluid passage. The plug may substantially prevent the removed material from entering the second portion of the fluid passage.

The plug may be configured as or include an inflatable bladder. The configuring of the plug within the fluid passage may include: inserting the plug into the fluid passage while the inflatable bladder is deflated using a catheter; and inflating the inflatable bladder using the catheter to cause the plug to plug the fluid passage and fluidly isolate the first portion of the fluid passage from the second portion of the fluid passage.

An outer diameter of the plug, when the inflatable bladder is deflated and the plug is being inserted into the fluid passage, may be smaller than an inner diameter of the fluid passage with the material on the interior surface.

The plug may be removed from the fluid passage after substantially all of the removed material is directed out of the fluid passage. The removed material may be directed out of the fluid passage using suction.

The configuring of the plug may include inserting the plug into the fluid passage and then configuring the plug to substantially plug the fluid passage.

The plug may be selectively configurable between a compact configuration and an expanded configuration. The plug may be inserted into the fluid passage in the compact configuration. The plug may plug the fluid passage in the expanded configuration.

The plug may be configured within the fluid passage using a catheter.

The plug may be configured as or otherwise include an expandable bladder.

The plug may include a shield facing the first portion of the fluid passage.

The material may be removed from the interior surface using at least a stream of pressurized fluid.

The method may include: inserting a nozzle into the first portion of the fluid passage. The stream of pressurized fluid may be directed out of the nozzle towards the interior surface to remove at least some of the material from the interior surface.

The stream of pressurized fluid may be a first stream of pressurized fluid. The material may be further removed from the interior surface using at least a second stream of pressurized fluid. The second stream of pressurized fluid may be directed out of the nozzle towards the interior surface to remove some of the material from the interior surface.

The stream of pressurized fluid may be directed out of the nozzle such that at least the stream of pressurized fluid propels the nozzle within the first portion of the fluid passage towards the plug.

The method may include: moving the nozzle within the first portion of the fluid passage towards the plug. The plug may be configured within the fluid passage using a catheter.

The nozzle may move within the fluid passage next to the catheter.

The nozzle may be configured with and move along the catheter.

The nozzle may be discrete from the catheter.

The gas turbine engine system may include a turbine stator vane. The fluid passage may include a lubrication conduit that extends through the turbine stator vane. The lubrication conduit may include the first portion of the fluid passage.

The foregoing features and the operation of the invention will become more apparent in light of the following description and the accompanying drawings.

DETAILED DESCRIPTION OF THE INVENTION

Figure 1:
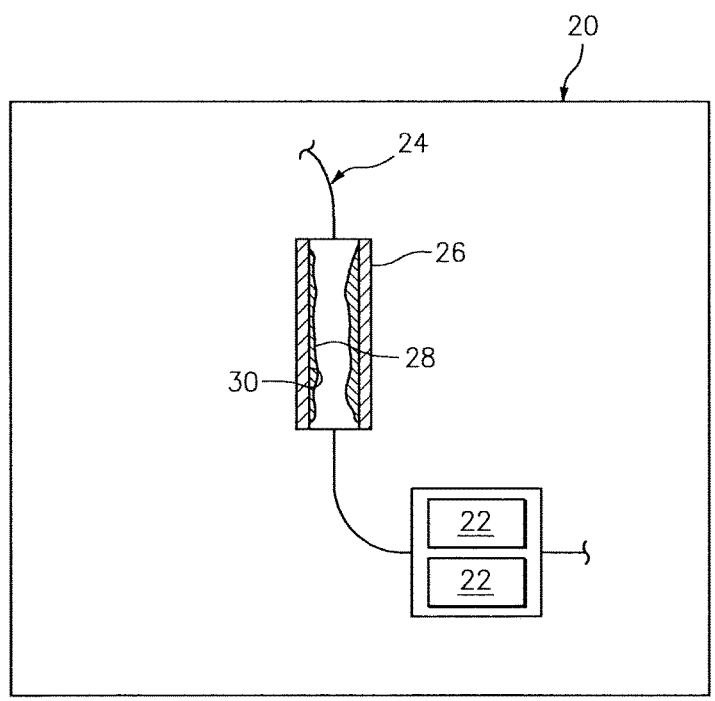
FIG. 1 is a schematic illustration of a system for a gas turbine engine.

A gas turbine engine may include a system 20 for delivering or circulating fluid to one or more downstream component(s) 22. A simplified schematic of such a gas turbine engine system 20 is illustrated in FIG. 1. For ease of description, this gas turbine engine system 20 of FIG. 1 is described below as a lubrication system. The present disclosure, however, is not limited to such an exemplary gas turbine engine system. The gas turbine engine system 20, for example, may alternatively (or also) be configured as a fuel delivery system, a heat exchange system, and/or any other system which directs fluid into, within and/or out of the gas turbine engine.

The lubrication system 20 of FIG. 1 includes a fluid passage 24, which is at least partially or completely disposed within the gas turbine engine. The term "fluid passage" may describe any structure (or structures) that has or forms a fluid pathway; e.g., a fluid flowpath. The fluid passage 24 of FIG. 1, for example, includes at least one fluid conduit 26 such as, but not limited to, a tube, a hose or a pipe. The fluid passage 24, however, may also or alternatively include one or more other components which have or form a pathway therethrough. For example, the fluid passage 24 may also or alternatively be configured as or include a manifold, a heat exchanger, a valve and/or any other component of the gas turbine engine with an internal channel, aperture, plenum, chamber, etc. through which fluid may flow.

Repeated heat cycles of the gas turbine engine may cause material 28 from the fluid within the fluid passage 24 to accumulate/buildup on an interior surface 30 (or surfaces) of the fluid passage 24. Lubricant such as oil (or other hydrocarbon-based fluids such as fuel, etc.), in particular, may coke on the interior surface 30 of the fluid passage 24; e.g., lubricant residue may be baked or otherwise disposed onto the interior surface 30. As this coked lubricant material 28 accumulates/buildups on the interior surface 30 of the fluid passage 24, lubricant flow capability through that fluid passage 24 decreases and may eventually stop due to a coked lubricant material 28 blockage. Such a reduction or blockage of lubricant flow, in turn, may starve downstream component(s) 22 of the gas turbine engine such as bearings, nozzles, etc. of lubricant, which may lead to inefficient operation of or failure of those or other downstream component(s).

Figure 2:
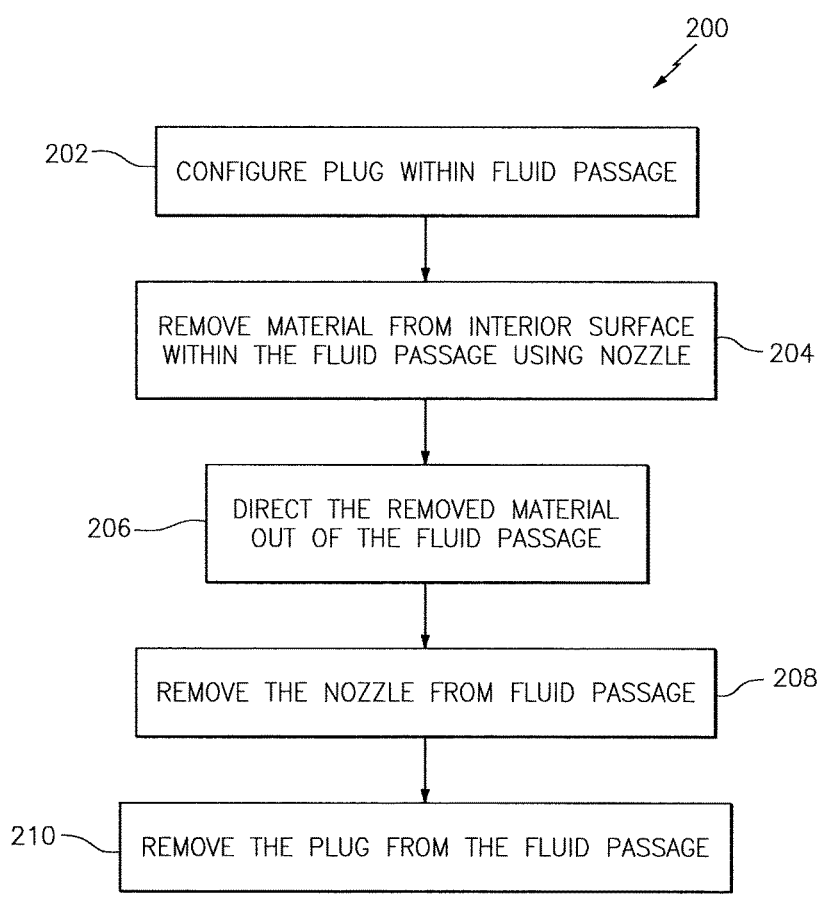
FIG. 2 is a flow diagram of a method for cleaning, reconditioning, repairing and/or otherwise treating at least a portion of a fluid passage.

FIG. 2 is a flow diagram of a method 200 for cleaning, reconditioning, repairing and/or otherwise treating at least a portion of a fluid passage such as the fluid passage 24 of FIG. 1. During this method 200, the gas turbine engine may remain be substantially assembled. The fluid passage 24 being treated therefore may remain configured with (e.g., located within, "in situ") the gas turbine engine and its system 20.

Figure 3:
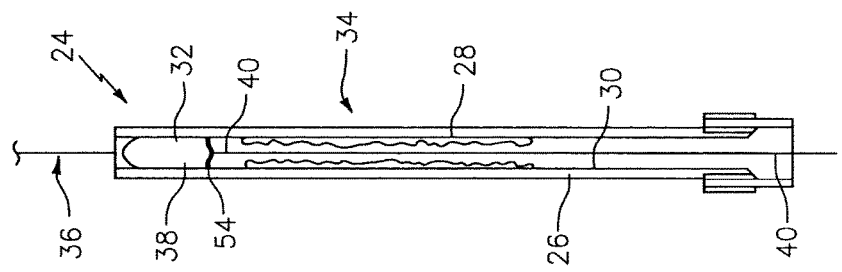
FIGS. 3-5 are a sequence of schematic illustrations depicting configuring a plug within a fluid passage.
Figure 4:
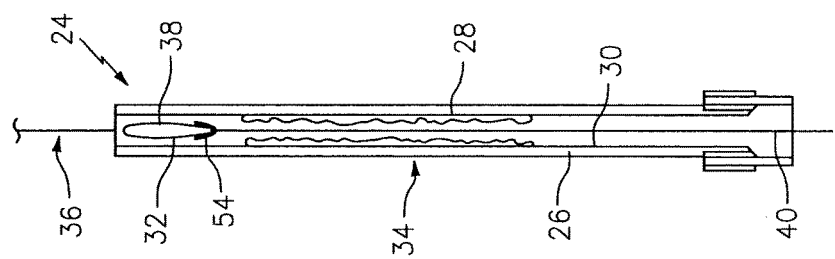
Figure 5:
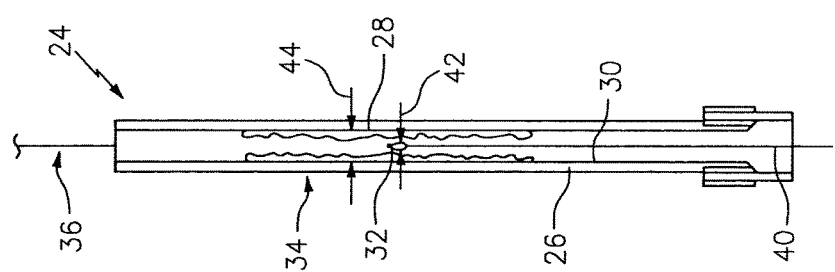

In step 202, a plug 32 is configured within the fluid passage 24, for example, as shown in the sequence of FIGS. 3-5. Once configured within the fluid passage 24 (see FIG. 5), the plug 32 substantially fluidly divides a first (e.g., upstream) portion 34 of the fluid passage 24 from a second (e.g., downstream) portion 36 of the fluid passage 24, which second portion 36 is shown schematically in the drawings. The plug 32 thereby fluidly isolates the first portion 34 from the second portion 36 such that fluid and/or debris within the first portion 34 is substantially blocked from moving into the second portion 36 of the fluid passage 24 or downstream thereof towards or to the component(s) 22 (see FIG. 1).

The plug 32 may be configured as or include an expandable (e.g., inflatable) bladder 38 such as, but not limited to, a balloon or airbag. This expandable bladder 38 may be affixed to a distal end of a catheter 40 or any other suitable tool. With such a configuration, the plug 32 may be inserted into the fluid passage 24 when the expandable bladder 38 has a compact (e.g., collapsed) configuration as shown in FIG. 3. In this compact configuration, the plug 32 and the expandable bladder 38 have a relatively small form factor such that the plug 32 can be moved through the fluid passage 24 without, for example, disrupting, dislodging or otherwise removing the material 28 on the interior surface 30 of the fluid passage 24. More particularly, in its compact configuration, the plug 32 and its expandable bladder 38 may have an outer diameter 42 that is less than an inner diameter 44 of the fluid passage 24 with the material 28 on the interior surface 30. Note, if the material 28 is removed during the configuring of the plug 32 within the fluid passage 24, the removed material 28 may move into the second portion 36 of the fluid passage 24 or further downstream towards or to the component(s) 22 (see FIG. 1).

Once the plug 32 is located at a certain position within the fluid passage 24 (see FIG. 4), the plug 32 may be configured into an expanded configuration as shown by the sequence of FIGS. 4 and 5. More particularly, fluid such as air or any other gaseous or liquid medium may be pumped through the catheter 40 and into the expandable bladder 38 thereby causing the expandable bladder 38 to inflate. Once inflated as shown in FIG. 5, the plug 32 radially engages and is biased radially towards a sidewall (e.g., the interior surface 30) of the fluid passage 24. In this manner, the plug 32 plugs the fluid passage 24 and thereby substantially fluidly isolates the first portion 34 of the fluid passage 24 from the second portion 36 of the fluid passage 24.

Figure 8:
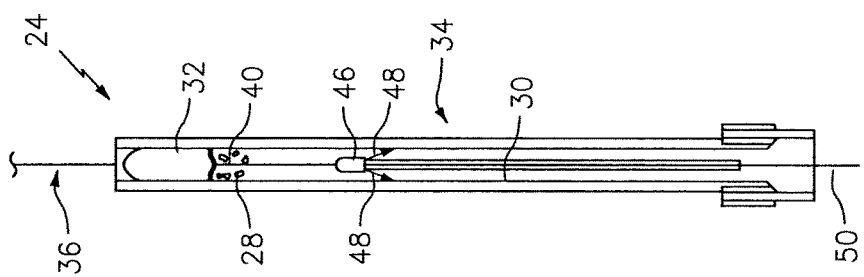
FIGS. 6-8 are a sequence of schematic illustrations depicting removal of material from an interior surface of the fluid passage.
Figure 7:
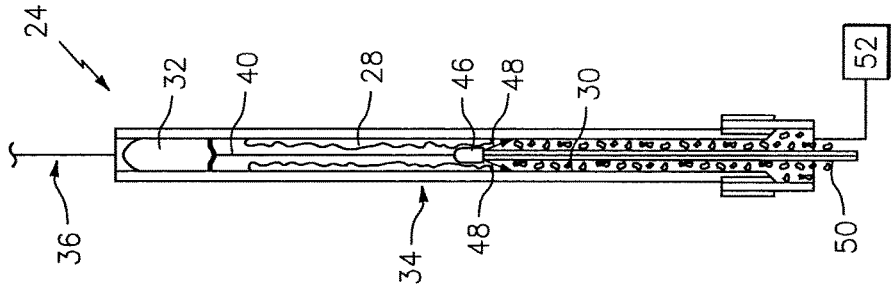
Figure 6:
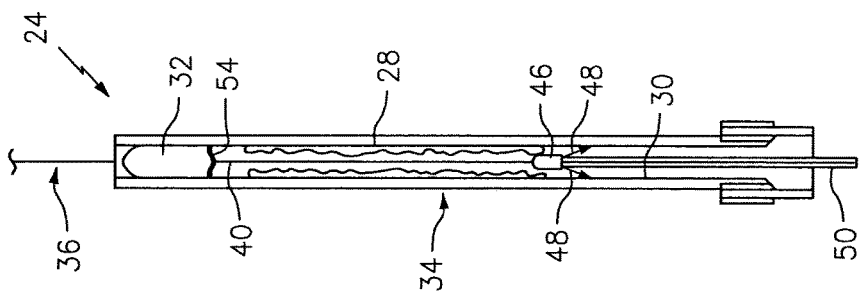
Figure 10:
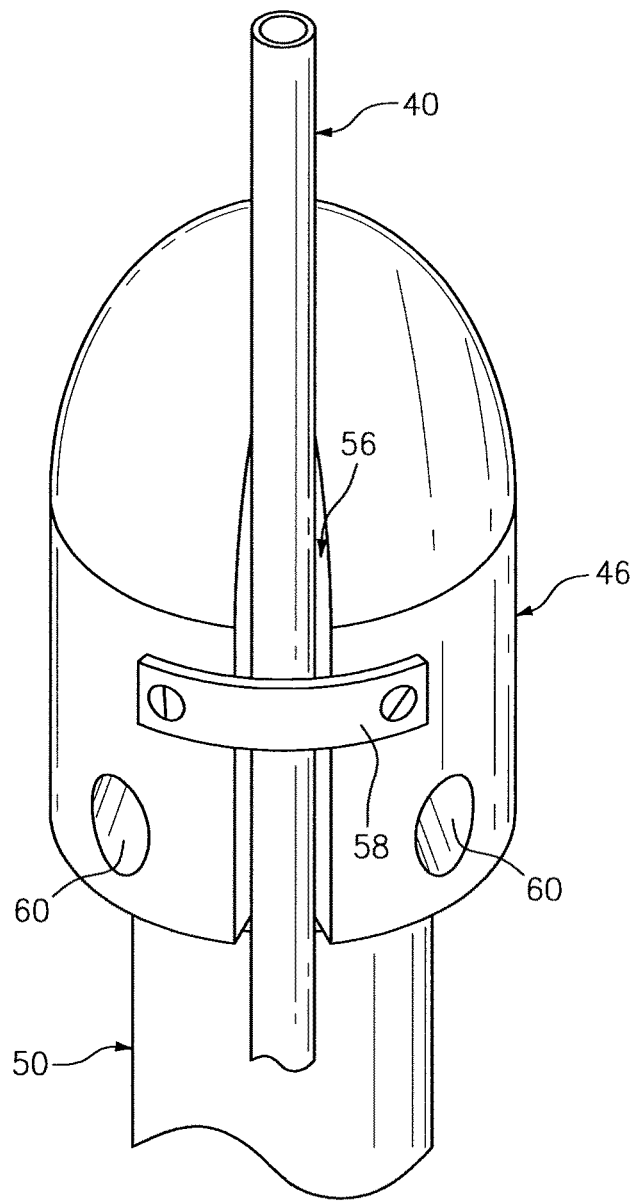
FIG. 10 is a perspective illustration of a fluid jet nozzle configured with a catheter.
Figure 11:
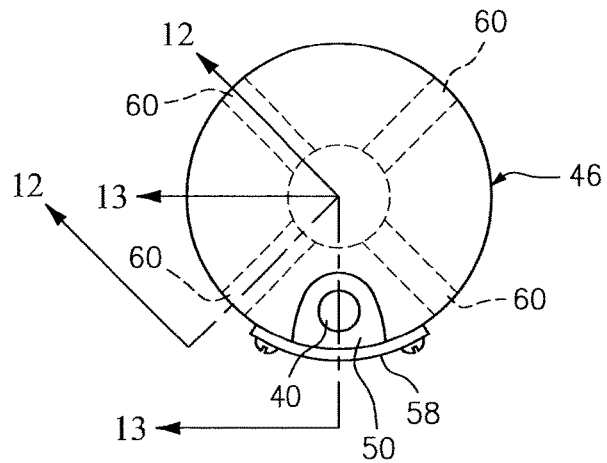
FIG. 11 is a distal end illustration of the fluid jet nozzle.
Figures 12, 13:
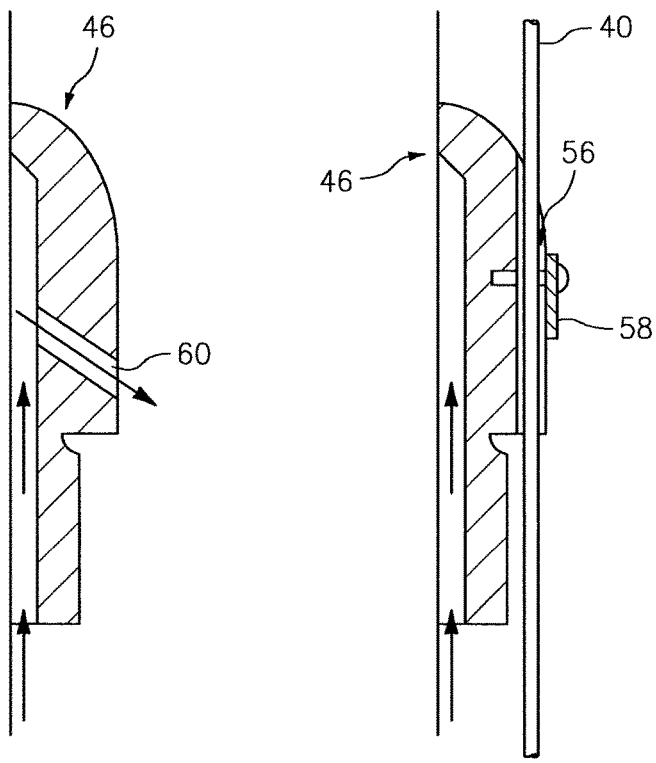
FIGS. 12 and 13 are partial sectional illustrations of the fluid jet nozzle of FIG. 11.

In step 204, at least some of the material 28 within the first portion 34 of the fluid passage 24 is removed from the interior surface 30 as shown, for example, in FIGS. 6-8. A fluid jet nozzle 46 attached to a high pressure fluid line 50, for example, may be inserted into the fluid passage 24 and, more particularly, the first portion 34 of the fluid passage 24. This nozzle 46 is configured to direct one or more streams 48 (e.g., jets) of pressurized fluid (e.g., liquid) out of the nozzle 46 and towards the interior surface 30. These streams 48 of pressurized fluid impact against the material 28 built up on the interior surface 30 in such a fashion so as to dislodge particles of the material 28 from the interior surface 30 of the fluid passage 24; see FIG. 7. One or more of the streams 48 of the pressurized fluid may also be directed out of the nozzle 46 in such a fashion (e.g., backwards) so as to propel the nozzle 46 longitudinally through the fluid passage 24 towards the plug 32 and the second portion 36. Alternatively or in addition to, the nozzle 46 may be pushed through the fluid passage 24 by the high pressure fluid line 50.

During this material 28 removal step 204, the plug 32 remains within the fluid conduit 26 and fluidly isolates the first portion 34 from the second portion 36. In this manner, as shown in FIG. 8, the plug 32 may prevent particles of the material 28 removed from the interior surface 30 from moving through the fluid passage 24 into the second portion 36 or further downstream.

In step 206, the material 28 removed from the interior surface 30 (the "removed material") is directed out of the fluid passage 24. Suction provided by a vacuum 52 (see FIG. 7), pump or other device, for example, may be applied to the fluid passage 24 at an open end thereof through which the plug 32 and nozzle 46 are inserted. The suction may be applied during the step 204 and/or subsequent to the step 204. In this manner, the removed material 28 is removed from the fluid passage 24 and prevents that material 28 from later contaminating the lubricant in the system 20.

In step 208, the nozzle 46 is removed from the fluid passage 24. The nozzle 46, for example, may be moved backwards through the fluid passage 24 by pulling on its high pressure fluid line 50.

Figure 9:
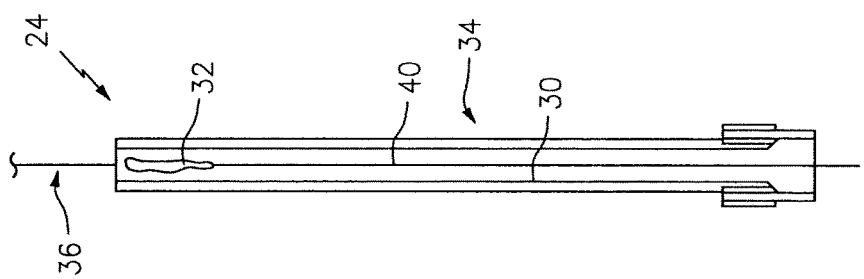
FIG. 9 is a schematic illustration depicting removal of the plug.

In step 210, the plug 32 is removed from the fluid passage 24. This plug 32 is, more particularly, removed after substantially all of the removed material 28 is out of the fluid passage 24 to prevent future contamination of the lubricant in the system 20. The plug 32 may be removed by first withdrawing the fluid from within the expandable bladder 38 such that the plug 32 is in a more compact configuration; see FIG. 9. The collapsed plug 32 may then be moved backwards through the fluid passage 24 by pulling the catheter 40.

In some embodiments, the plug 32 may be located by pushing the catheter 40 into the fluid passage 24 a predetermined distance. Similarly, in some embodiments, the material 28 removal process may be started when the high pressure fluid line 50 is a first predetermined distance into the fluid passage 24. The material 28 removal process may then be terminated, or the nozzle 46 may be moved in an opposite direction, when the high pressure fluid line 50 is a second, deeper predetermined distance into the fluid passage 24.

In some embodiments, the plug 32 may include a shield 54 (see FIGS. 4-6). This shield 54 may be configured as a reinforced portion of the expandable bladder 38, or a separate element configured with the bladder 38. The shield 54 is located proximate the connection between the plug 32 and the catheter 40 in order to protect the expandable bladder 38 from debris and/or ricocheted pressurized fluid.

In some embodiments, the nozzle 46 may be configured discrete from the catheter 40. In such embodiments, while the nozzle 46 moves longitudinally along the catheter 40 within the fluid passage 24, the nozzle 46 is not connected or integrated with the catheter 40. In other embodiments, however, the nozzle 46 may be configured with the catheter 40, for example, as shown in FIGS. 10-13. In such an embodiment, the catheter 40 may be configured within a longitudinal extending channel 56 in the nozzle 46 and secured to the nozzle 46 by a clasp or retainer 58. With such a configuration, the nozzle 46 may be guided through the fluid passage 24 along the catheter 40. In addition, the nozzle 46 may be positioned with respect to the catheter 40 such that the streams 48 of the pressurized fluid are directed out of apertures 60 towards the interior surface 30, not the catheter 40.

Various fluids may be directed through the high pressure fluid line 50 and out of the nozzle 46 via apertures 60 to provide the one or more streams 48 of pressurized fluid. The fluid, for example, may be the same or similar type of fluid (e.g., lubricant) as the fluid directed through the fluid passage 24 during turbine engine operation. In this manner, any fluid residue from the method 200 will not affect operation of the system 20. In some embodiments, the fluid may include a solvent. In some embodiments, the fluid may include particulates to increase its abrasiveness. In other embodiments, the fluid may be substantially particulate free. The method 200 of the present disclosure, of course, is not limited to the foregoing exemplary fluids.

Figure 14:
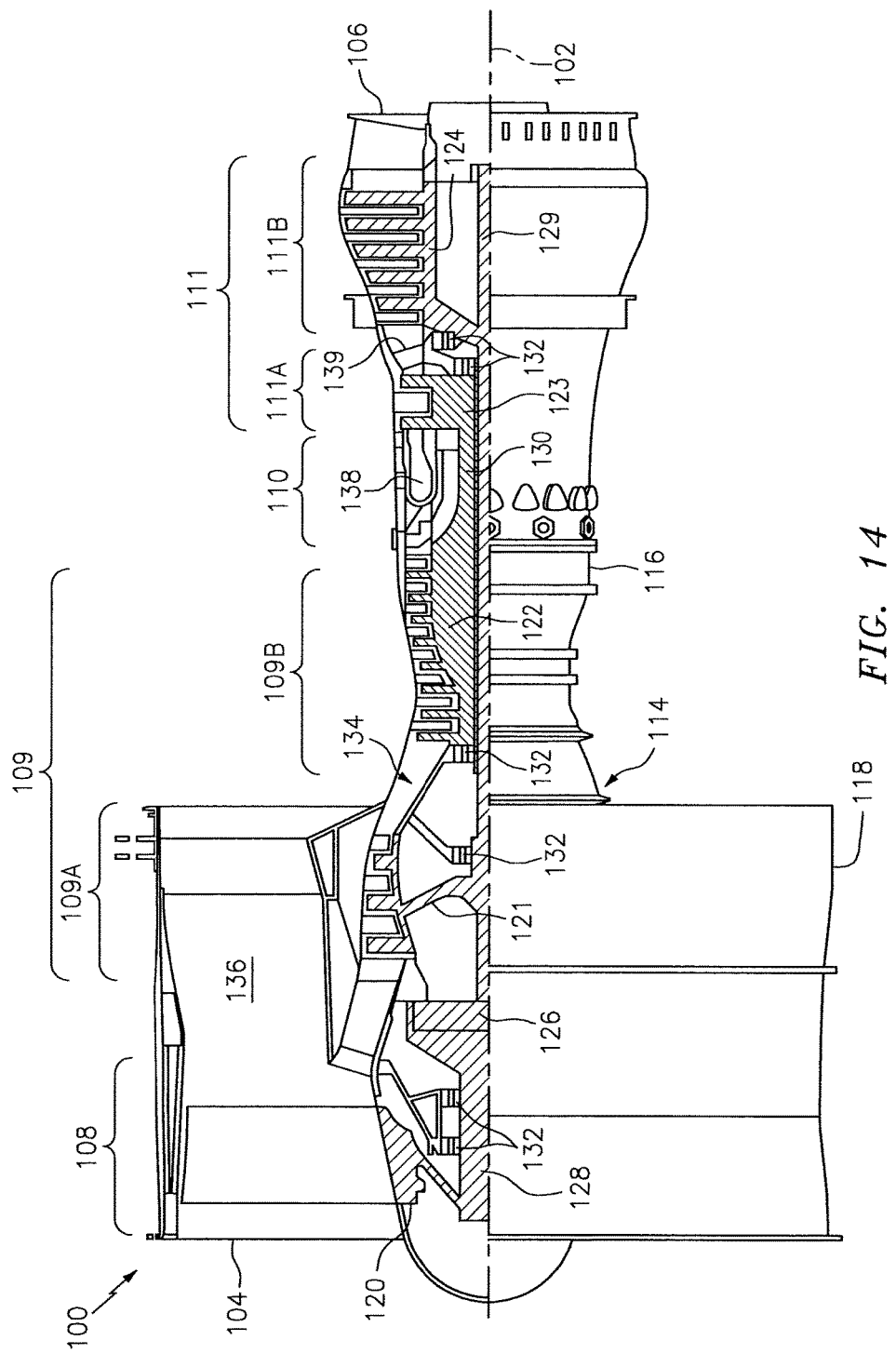
FIG. 14 is a side cutaway illustration of a gas turbine engine.

In some embodiments, the system 20 may be in an aero gas turbine engine. FIG. 14 illustrates an exemplary embodiment of such a gas turbine engine 100, which is configured as a geared turbofan gas turbine engine. This turbine engine 100 extends along an axis 102 between an upstream airflow inlet 104 and a downstream airflow exhaust 106. The turbine engine 100 includes a fan section 108, a compressor section 109, a combustor section 110 and a turbine section 111. The compressor section 109 includes a low pressure compressor (LPC) section 109A and a high pressure compressor (HPC) section 109B. The turbine section 111 includes a high pressure turbine (HPT) section 111A and a low pressure turbine (LPT) section 111B.

The engine sections 108-111 are arranged sequentially along the axis 102 within an engine housing 114. This housing 114 includes an inner case 116 (e.g., a core case) and an outer case 118 (e.g., a fan case). The inner case 116 may house one or more of the engine sections 109-111; e.g., an engine core. The outer case 118 may house at least the fan section 108.

Each of the engine sections 108, 109A, 109B, 111A and 111B includes a respective rotor 120-124. Each of these rotors 120-124 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 120 is connected to a gear train 126, for example, through a fan shaft 128. The gear train 126 and the LPC rotor 121 are connected to and driven by the LPT rotor 124 through a low speed shaft 129. The HPC rotor 122 is connected to and driven by the HPT rotor 123 through a high speed shaft 130. The shafts 128-130 are rotatably supported by a plurality of bearings 132. Each of these bearings 132 is connected to the engine housing 114 by at least one stationary structure such as, for example, an annular support strut.

During operation, air enters the turbine engine 100 through the airflow inlet 104. This air is directed through the fan section 108 and into a core gas path 134 and a bypass gas path 136. The core gas path 134 extends sequentially through the engine sections 109-111. The bypass gas path 136 extends away from the fan section 108 through a bypass duct, which circumscribes and bypasses the engine core. The air within the core gas path 134 may be referred to as "core air". The air within the bypass gas path 136 may be referred to as "bypass air".

The core air is compressed by the compressor rotors 121 and 122 and directed into a combustion chamber 138 of a combustor in the combustor section 110. Fuel is injected into the combustion chamber 138 and mixed with the compressed core air to provide a fuel-air mixture. This fuel air mixture is ignited and combustion products thereof flow through and sequentially cause the turbine rotors 123 and 124 to rotate. The rotation of the turbine rotors 123 and 124 respectively drive rotation of the compressor rotors 122 and 121 and, thus, compression of the air received from a core airflow inlet. The rotation of the turbine rotor 124 also drives rotation of the fan rotor 120, which propels bypass air through and out of the bypass gas path 136. The propulsion of the bypass air may account for a majority of thrust generated by the turbine engine 100, e.g., more than seventy-five percent (75%) of engine thrust. The turbine engine 100 of the present disclosure, however, is not limited to the foregoing exemplary thrust ratio.

The fluid passage 24 and its conduit 26 (see FIG. 1) may be within and extend through a stator vane such as, but not limited to, a turbine stator vane 139 in the turbine section 111. More particularly, the conduit 26 may extend radially within or through the turbine stator vane 139 in a mid-turbine frame between the HPT section 111A and the LPT section 111B. Of course, the fluid passage 24 and its conduit 26 may also or alternatively be configured with other components of the gas turbine engine 100.

The system 20 may be included in various aircraft and industrial turbine engines other than the one described above. The system 20, for example, may be included in a geared turbine engine where a gear train connects one or more shafts to one or more rotors in a fan section, a compressor section and/or any other engine section. Alternatively, the system 20 may be included in a turbine engine configured without a gear train. The system 20 may be included in a geared or non-geared turbine engine configured with a single spool, with two spools (e.g., see FIG. 14), or with more than two spools. The turbine engine may be configured as a turbofan engine, a turbojet engine, a propfan engine, a pusher fan engine or any other type of turbine engine. The present disclosure therefore is not limited to any particular types or configurations of turbine engine.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method involving a gas turbine engine system, comprising:
    configuring a plug within a fluid passage in the gas turbine engine system using a catheter, the plug between first and second portions of the fluid passage;
    inserting a nozzle into the first portion of the fluid passage;
    moving the nozzle within the first portion of the fluid passage towards the plug, wherein the nozzle moves within the fluid passage next to the catheter;
    removing material from an interior surface of the fluid passage in the first portion of the fluid passage to provide removed material, wherein the plug substantially prevents the removed material from entering the second portion of the fluid passage, the material is removed from the interior surface using at least a stream of pressurized fluid, and the stream of pressurized fluid is directed out of the nozzle towards the interior surface to remove at least some of the material from the interior surface;
    directing the removed material out of the fluid passage; and
    removing the plug from the fluid passage.

2. The method of claim 1, wherein the plug is removed from the fluid passage after substantially all of the removed material is directed out of the fluid passage, and the removed material is directed out of the fluid passage using suction.

3. The method of claim 1, wherein the configuring of the plug comprises inserting the plug into the fluid passage and then configuring the plug to substantially plug the fluid passage.

4. The method of claim 1, wherein the plug comprises an expandable bladder.

5. The method of claim 1, wherein the plug comprises a shield facing the first portion of the fluid passage.

6. The method of claim 1, wherein the stream of pressurized fluid is a first stream of pressurized fluid, the material is further removed from the interior surface using at least a second stream of pressurized fluid, and the second stream of pressurized fluid is directed out of the nozzle towards the interior surface to remove some of the material from the interior surface.

7. The method of claim 1, wherein the stream of pressurized fluid is directed out of the nozzle such that at least the stream of pressurized fluid propels the nozzle within the first portion of the fluid passage towards the plug.

8. The method of claim 1, wherein the nozzle is configured with and moves along the catheter.

9. The method of claim 1, wherein the nozzle is discrete from the catheter.

10. The method of claim 1, wherein the gas turbine engine system comprises a turbine stator vane, the fluid passage comprises a lubrication conduit that extends through the turbine stator vane, and the lubrication conduit comprises the first portion of the fluid passage.

11. The method of claim 1, wherein the plug comprises an inflatable bladder.

12. The method of claim 3, wherein
    the plug is selectively configurable between a compact configuration and an expanded configuration;
    the plug is inserted into the fluid passage in the compact configuration; and
    the plug plugs the fluid passage in the expanded configuration.

13. The method of claim 11, wherein configuring of the plug within the fluid passage comprises:
    inserting the plug into the fluid passage while the inflatable bladder is deflated; and
    inflating the inflatable bladder to cause the plug to plug the fluid passage and fluidly isolate the first portion of the fluid passage from the second portion of the fluid passage.

14. A method involving a gas turbine engine system, comprising:

configuring a plug within a fluid passage in the gas turbine engine system, the plug between first and second portions of the fluid passage inserting a nozzle into the fluid passage;

directing a stream of pressurized fluid out of the nozzle towards an interior surface of the fluid passage to remove material from the interior surface of the fluid passage, the interior surface in the first portion of the fluid passage, wherein the plug substantially prevents the removed material from entering the second portion of the fluid passage; and directing the removed material out of the fluid passage along a path in which the nozzle was inserted into the fluid passage;

wherein the plug comprises an inflatable bladder, and wherein the configuring of the plug within the fluid passage comprises:

inserting the plug into the fluid passage while the inflatable bladder is deflated using a catheter; and inflating the inflatable bladder using the catheter to cause the plug to plug the fluid passage and fluidly isolate the first portion of the fluid passage from the second portion of the fluid passage.

15. The method of claim 14, wherein an outer diameter of the plug, when the inflatable bladder is deflated and the plug is being inserted into the fluid passage, is smaller than an inner diameter of the fluid passage with the material on the interior surface.

\* \* \* \* \*